Sept. 26, 1933.  W. A. TRATSCH  1,927,996
DISTRIBUTOR
Filed Aug. 19, 1932
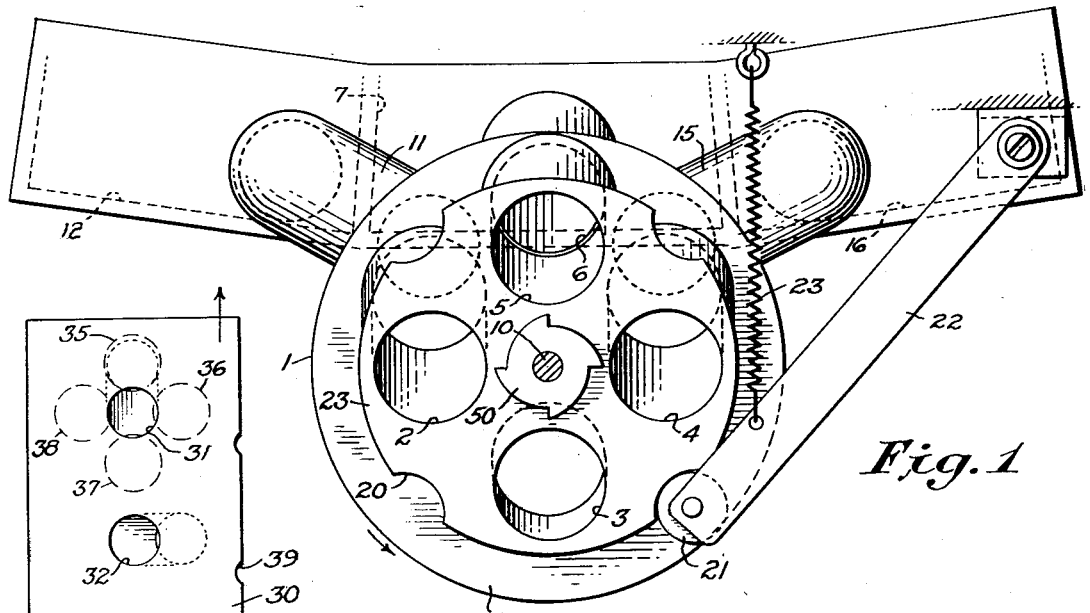
Fig. 1
Fig. 5
Fig. 2
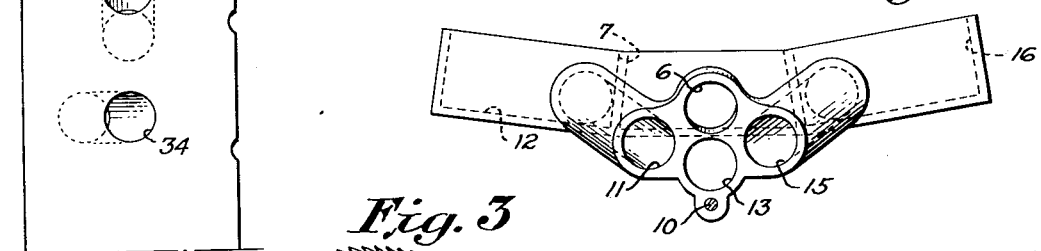
Fig. 3
Fig. 4
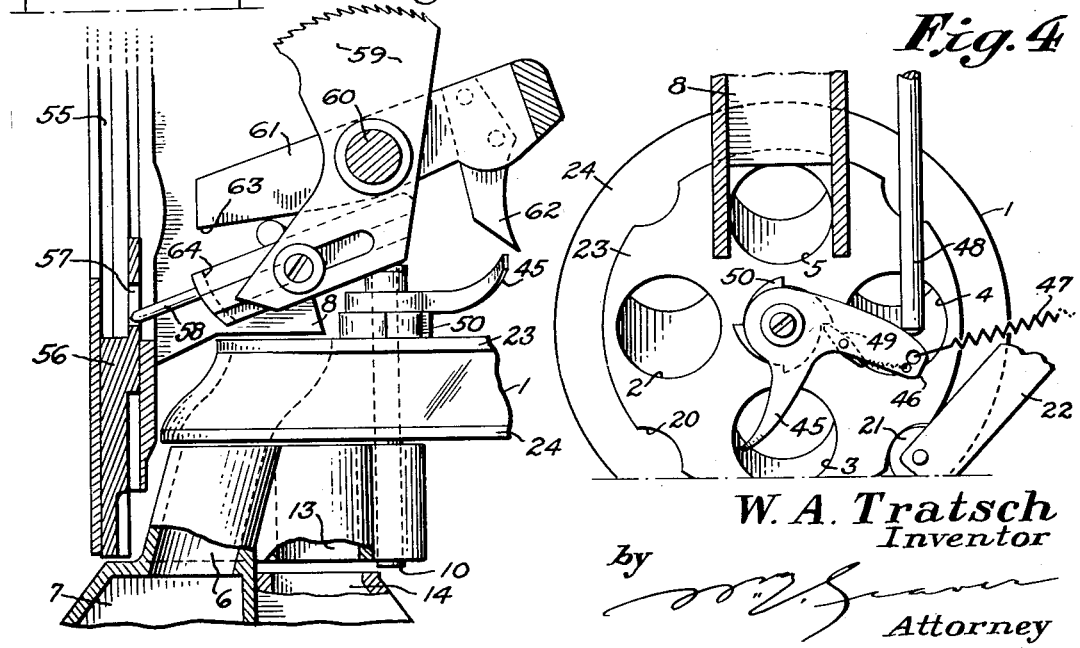
W. A. Tratsch
Inventor
by
Attorney Patented Sept. 26, 1933

1,927,996

UNITED STATES PATENT OFFICE 1,927,996

DISTRIBUTOR

Walter A. Tratsch, Chicago, Ill.

Application August 19, 1932. Serial No. 629,522

18 Claims. (Cl. 193—23)

This invention relates to a distributor for merchandise or other articles and has for its object to provide a construction simple in parts and more efficient in operation than those heretofore proposed.

With these and other objects in view the invention resides in the novel details of construction and combinations of parts as will be disclosed more fully hereinafter and particularly pointed out in the claims.

Referring to the accompanying drawing forming a part of this specification in which like numerals designate like parts in all the views, Fig. 1 is a top plan view of the distributor with associated delivery chutes and means for holding the distributor in registration therewith;

Fig. 2 is a detail top plan view illustrating a delivery chute casting for directing the merchandise into different receptacles;

Fig. 3 is a detail side elevational view illustrating a mechanism for changing the position of the distributor;

Fig. 4 is a top plan view of the distributor with associated cam lever for moving the same; and Fig. 5 is a diagrammatic showing of a modified form of distributor.

This is a continuation in part of the application of Walter A. Tratsch filed Sept. 2, 1930 under the Serial No. 479,315 for improvements in an amusement device, but the invention forming the subject matter of this divisional application is not specifically limited to use in such a device, since it can be used wherever there is desired a classification, or segregation, or distribution of articles. In other words, while this distributor was specifically described in connection with the segregation of coins or tokens used in connection with said amusement device, yet this distributor could be equally well used for directing other articles from a single source to and into plural receptacles, and therefore its use is practically unlimited where said articles are so handled. In the following description, however, it will be described in connection with the handling of coins or tokens for the sake of brevity and in accordance with the fact that this is a division of the previously filed application for U. S. Letters Patent in which it was similarly described.

The distributor is generally indicated in Fig. 1 by the numeral 1 and is provided with four substantially cylindrical passages 2, 3, 4 and 5, the axes of which are differently pitched. That is to say it will be readily seen that the passage 5 is shown in one of the positions that the distributor may assume, and said passage is in complete registry with a chute 6 leading to a receptacle indicated by the numeral 7, and therefore an article dropped through the hopper 8 will travel through the passages 5 and 6 into said receptacle. The distributor as shown in Fig. 1 is circular and mounted upon a central pivot shaft 10 so that it may be rotated in the direction of the arrow through a succession of quarter turns if there be four passages as shown but, of course, with any other number of passages the arcs of rotation will be made in accordance with said number.

For example, the distributor is shown with passage 5 in position to convey articles to a receptacle such as 7 but if the distributor be rotated in a counterclockwise direction, its passage 4 may be moved to the position previously occupied by passage 5, but the passage 4 has an axis which is differently disposed from the axis of passage 5 and therefore, when the distributor has been so rotated, its passage 4 will be in registry with chute 11 which leads to the receptacle 12, and therefore any article dropped through the distributor will pass to said receptacle.

In a similar manner upon a further like amount of rotation the passage 3 will have been moved to assume a position previously occupied by passages 5 and 4, but because of a further difference of inclination of its axis, said passage 3 will then be in registry with chute 13 leading to the receptacle 14. Lastly, when the passage 2 has been moved through another like amount of rotation to bring it into the position previously occupied by passages 5, 4 and 3, then it will be in registry with chute 15 leading to the receptacle 16 because the axis of passage 2 is of a still different inclination from those of the other passages.

Registry of each passage of the distributor with the chutes leading to the receptacles is assured by the provision of four notches such as 20 spaced 90° apart in the case where four passages are provided, said notches being disposed in the upper edge of the distributor and which notches are consecutively engaged by a roller 21 carried at the end of a pivoted arm 22 controlled by a spring 23, said notches being so disposed that when the roller is engaged in a notch, one of the passages of the distributor will be in registry with one of the chutes.

The chutes 6, 11, 13 and 15 may be independent of each other or they may be joined in a casting as shown in Fig. 2 in which latter case said casting also provides a mounting for the central pivot shaft 10 about which the distributor rotates. The chutes may be of any length as desired and the receptacles 7, 12, 14 and 16 may be either separate or disposed in a group.

It is to be particularly noted that in Fig. 1 the distributor is circular and provided with a top plate 23 and a bottom plate 24 and that the passages 2, 3, 4 and 5 terminate in the outer faces of said plates. The terminals of these passages in the top plate are equally spaced from each other but, because of the difference in inclination of the axes of said passages, the terminals in the bottom plate are unequally spaced. The distributor may be a solid casting or it may be formed of two parallel plates such as 23 and 24 having integrally disposed therebetween the substantially cylindrical conduits constituting the passages 2, 3, 4 and 5.

On the other hand, the distributor may be of other form than circular and in Fig. 5 is shown one of several modifications that could be made. In this figure the distributor comprises a bar or plate generally indicated by the numeral 30 provided with the passages 31, 32, 33 and 34 through which the articles may be directed to one of a plurality of receptacles, which latter are not shown in this figure. However, the dashed circles 35, 36, 37 and 38 diagrammatically represent the upper terminals of chutes leading to such receptacles said terminals being located in a plane parallel to and substantially contacting the undersurface of the bar distributor 30.

The passage 31 in Fig. 5 will be seen to extend upwardly, the passage 32 to extend to the right, the passage 33 to extend downwardly, and passage 34 to extend to the left whereupon, when the distributor 30 is moved in the direction of the arrow, passage 31 may be brought into registry with the chute represented by the dashed circle 35, the passage 32 may be brought into registry with the chute represented by the dashed circle 36, and similarly and consecutively the passages 33 and 34 may be brought into registry with the chutes represented by the dashed circles 37 and 38 respectively. In order to insure proper registry there may be provided any suitable means which in this figure is likewise shown to be a series of notches indicated at 39 to be engaged by a detent or roller not illustrated but functioning in the same manner as the roller 21 shown in Fig. 1. It will be understood that with any type of distributor used the several chutes will have their upper terminals so grouped as to be readily accessible for registration with the passages of the distributor.

The means for moving the distributor may be any that is desired and which will accomplish the purpose, but in the drawing there has been illustrated, only by way of example, one way by which the circular distributor 1 may be moved. Loosely mounted on the shaft 10 is a cam 45 (see Fig. 4) having a tail 46 to the end of which is secured a spring 47 normally causing said tail to abut a fixed post or stop 48. To the under side of said tail is pivoted a spring controlled pawl 49 adapted to engage one of the four teeth of a ratchet 50 rigidly formed on the top of the distributor, and the parts are so dimensioned and positioned that when the cam 45 is engaged and moved through its complete intended movement, the pawl 49 carried thereby will be brought into position to engage the next tooth of the ratchet 50, and when this movement is completed the spring 47 will exert a pull through the tail of the cam to cause a 90° revolution of the distributor, the friction between the holding roller 21 and the notch of the distributor which it occupies being sufficient to prevent a retrograde rotation of the distributor. If found necessary a brake in the nature of a leaf spring may be employed to engage the under surface or any other surface of the distributor to assist in holding the same against retrograde movement, this being not illustrated for the purpose of clarity.

The means for actuating the cam 45 is shown in Fig. 3 but, in order that it be more clearly understood, reference is made to U. S. Letters Patent 1,766,152 granted June 24, 1930 to Walter A. Tratsch for improvements in control mechanism for vending machines which shows substantially the same operating mechanism. Briefly, when a solid disk or token is dropped down the coin chute 55 it ultimately comes to rest on a slide or elevator 56 vertically reciprocable in a groove provided therefor, the rear portion of said slide having an opening 57 therein into which projects at all times a lifting finger 58. This finger is carried by a plane slidably mounted in a groove formed in the lower portion of an oscillatable member 59 rigidly mounted upon a shaft 60 upon which latter is loosely mounted a lever 61 whose rear end carries a depending finger 62 adapted to engage the cam 45 of the distributor.

The forward end of said lever 61 has a lower corner 63 which may be struck by a shoulder 64 of the frame to which the lifting finger is secured, as when a solid center disk or token is carried by the elevating slide. On the other hand, when a disk or token with an open center is on said slide, then the lifting finger 58 can pass through said opening because its carrying frame is freely slidable on the oscillatable member 59, and when this occurs then the shoulder 64 is moved forward to such a position that it will not contact the corner 63 whereupon the lever 61 will not be oscillated and consequently the distributor will not be rotated. It will be understood that turning of the shaft 60 causes the lifting finger to raise the slide 56.

From this description of distributor control it will be understood that every time a solid centered disk or token is moved upwardly on the slide 56, there will be a fractional rotation of the distributor, and therefore in an amusement device such as disclosed in said co-pending application, the receptacles 7, 12 and 16 may be jack-pots or not, as desired, and receptacle 14 may be a coin box to hold the percentage of inserted coins which inure to the benefit of the owner of the device. Therefore, when solid centered coins or tokens are used, there will be a regular distribution thereof as a result of which each jack-pot gets one-fourth, and the owner of the device likewise gets one-fourth.

However, when open centered tokens are used, then there will be a break in the consecutive distribution because the lifting finger 58 will pass through the open center of the token and thereby prevent the rotation of the distributor. In such a case the open centered token will be delivered to the same receptacle which received the last previously inserted coin or token. In this connection it should be stated that when the slide or elevator 56 reaches the top of its movement there will be suitable means for passing the lifted coin therefrom and into the supply chute 8 leading to the distributor.

From what has been heretofore stated, it will be appreciated that a distributor of this character may be used in connection with an amusement device or it may be used in various other mechanisms wherever it is desired to effect the distribution of articles from a single source such as the chute 8 to a plurality of receptacles for said articles. Further, while a particular distributor control and movement has been described, by way of example, it will be understood that other means for changing the position of the distributor may be employed, and which means may be either automatic or manual, or may be governed electrically or otherwise.

When plural types of articles are contemplated, then the distributor would be moved most likely as the result of the human control element, and for such an example the handling of coal may be cited. That is to say, a train of many cars of coal would pass to a single discharge chute 8, and the first car containing lumps of furnace size would be conveyed to a receptacle such as 7; the second car of the train would perhaps contain buckwheat size coal and therefore the distributor would be changed so that when said car was dumped its contents would pass through the chute 8 to and through the distributor to a different receptacle such for example as 12; and so on, whereby the entire train load of coal would be properly classified in receiving bins by means of the distributor.

It is obvious that those skilled in the art may vary the details of construction as well as arrangements of parts without departing from the spirit of the invention, and therefore it is not desired to be limited to the foregoing except as may be required by the claims.

What is claimed is:—

1. A distributor for directing articles to receptacles, the same comprising a member having substantially parallel opposite faces with passages therebetween, said member movable in the plane of one face to bring a passage into registry with a receptacle, said passages so arranged that when one is in registry with a receptacle the other passages will be in non-registry with the other receptacles.

2. A distributor for directing articles to receptacles, the same comprising a member having two opposite faces, with passages extending through said member and terminating in said faces, said passages extending in different directions and so positioned that their intake terminals are equally spaced in the plane of one face and their outlet terminals are unequally spaced in the plane of the other face; and means to move said distributor to cause the intake terminals to successively assume similar positions while simultaneously causing the corresponding outlet terminals to assume dissimilar positions.

3. Means for directing articles to receptacles the same comprising a distributor member having two opposite substantially parallel faces, with passages extending through said member and terminating in said faces, said passages equally spaced in the plane of one face but unequally spaced in the plane of the other face; means to deliver articles to a passage of said distributor; means to receive articles from said distributor; and means to move said distributor to bring a passage thereof into position to conduct articles from said delivery means to a particular receiving means.

4. Means for directing articles to receptacles the same comprising a distributor member having two opposite substantially parallel faces, with passages extending through said member and terminating in said faces, said passages equally angularly disposed in the plane of one face but unequally angularly disposed in the plane of the other face; means to deliver articles to a passage of said distributor; means to receive articles from said distributor; and means to move said distributor to bring a passage thereof into position to conduct articles from said delivery means to a particular receiving means.

5. Means for directing articles to receptacles the same comprising a distributor member having two opposite substantially parallel faces, with passages extending through said member and terminating in said faces, said passages equally spaced in the plane of one face but unequally spaced in the plane of the other face; single means to deliver articles to a passage of said distributor; means to receive articles from said distributor; and means to move said distributor to bring a passage thereof into position to conduct articles from said delivery means to a particular receiving means.

6. Means for directing articles to receptacles the same comprising a distributor member having two opposite substantially parallel faces, with passages extending through said member and terminating in said faces, said passages equally spaced in the plane of one face but unequally spaced in the plane of the other face; single means to deliver articles to a passage of said distributor; plural means to receive articles from said distributor; and means to move said distributor to bring a passage thereof into position to conduct articles from said delivery means to a particular receiving means.

7. Means for directing articles to receptacles the same comprising a distributor member having two opposite substantially parallel faces, with passages extending through said member and terminating in said faces, said passages equally spaced in the plane of one face but unequally spaced in the plane of the other face; means to deliver articles to a passage of said distributor; means to receive articles from said distributor; and means for affecting the position of said distributor to cause a passage thereof to be in a position to conduct articles from said delivery means to a particular receiving means.

8. Means for directing articles to receptacles the same comprising a distributor member having two opposite substantially parallel faces, with passages extending through said member and terminating in said faces, said passages equally spaced in the plane of one face but unequally spaced in the plane of the other face; means to deliver articles to a passage of said distributor; means to receive articles from said distributor; and means governed by the delivery means for affecting the position of said distributor to cause a passage thereof to be in a position to conduct articles from said delivery means to a particular receiving means.

9. A distributor for directing articles to receptacles, the same comprising a member having passages therethrough, said member movable to bring a passage into registry with a receptacle, said passages so arranged that when one is in registry with a receptacle the other passages will be in non-registry with the other receptacles.

10. A distributor for directing articles to receptacles, the same comprising a member having passages therethrough, said member movable in the plane of one of its faces to bring a passage into registry with a receptacle, said passages so arranged that when one is in registry with a receptacle the other passages will be in non-registry with the other receptacles.

11. A distributor for directing articles to receptacles, the same comprising a member having two opposite substantially parallel faces, with passages extending through said member and terminating in said faces, said passages having axes, the axes disposed in planes parallel to each other, said member movable to bring a passage into registry with a receptacle, said passages so arranged that when one is in registry with a receptacle the other passages will be in non-registry with the other receptacles.

12. A distributor for directing articles to receptacles, the same comprising a member having two opposite substantially parallel faces, with passages extending through said member and terminating in said faces, said passages having axes equally spaced in the plane of one face but unequally spaced in the plane of the other face, the axes disposed in planes parallel to each other, said member movable to bring a passage into registry with a receptacle, said passages so arranged that when one is in registry with a receptacle the other passages will be in non-registry with the other receptacles.

13. A distributor for directing articles to receptacles, the same comprising a member having two opposite substantially parallel faces, with passages extending through said member and terminating in said faces, said passages having axes, the axes disposed in planes parallel to each other and substantially at right angles to the planes of said faces, said member movable to bring a passage into registry with a receptacle, said passages so arranged that when one is in registry with a receptacle the other passages will be in non-registry with the other receptacles.

14. A distributor for directing articles to receptacles, the same comprising a member having two opposite substantially parallel faces, with passages extending through said member and terminating in said faces, said passages having axes equally spaced in the plane of one face but unequally spaced in the plane of the other face, the axes disposed in planes parallel to each other and substantially at right angles to the planes of said faces, said member movable to bring a passage into registry with a receptacle, said passages so arranged that when one is in registry with a receptacle the other passages will be in non-registry with the other receptacles.

15. A distributor for directing articles to receptacles, the same comprising a member provided with a plurality of article conducting passages extending in different directions, the intake terminals of said passages having a disposition with respect to each other which is different from the similar disposition of the outlet terminals of said passages; and means to move said distributor between an article supply and said receptacles to selectively bring a passage into registry with the desired receptacle.

16. A distributor for directing articles from a single source to plural receptacles, the same comprising a member provided with a plurality of article conducting passages, a passage for each receptacle, the intake terminals of said passages on one side of said member and the outlet terminals of said passages on the other side thereof, said passages extending in different directions, and said member shiftable to bring a passage into position to conduct an article from the source to the desired receptacle.

17. In an apparatus of the character described the combination of a hopper for delivering articles; a plurality of receptacles and a chute for each, said chutes and receptacles for receiving the delivered articles; a distributor member bodily movable between said hopper and said chutes, said member provided with article conducting passages one for each chute; and means to move said member to bring about selective registration of said hopper and a desired chute.

18. In an apparatus of the character described the combination of a stationary hopper; a plurality of stationary chutes each leading to a receptacle; and a distributor member disposed between said hopper and said chutes, said member provided with a plurality of passages one for each chute, and said member shiftable to cause article conducting registry of said hopper and a single desired chute through one of said passages.

WALTER A. TRATSCH.